United States Patent
Katayama (10) Patent No.: US 8,044,335 B2
(45) Date of Patent: Oct. 25, 2011

(54) LEVEL SENSOR IMPLEMENTED WITH A PLURALITY OF LIGHT RECEIVING ELEMENTS

(75) Inventor: Yasutaka Katayama, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 429 days.

(21) Appl. No.: 12/095,482

(22) PCT Filed: Nov. 29, 2006

(86) PCT No.: PCT/JP2006/323804
§ 371 (c)(1),
(2), (4) Date: May 29, 2008

(87) PCT Pub. No.: WO2007/063893
PCT Pub. Date: Jun. 7, 2007

(65) Prior Publication Data
US 2009/0244548 A1    Oct. 1, 2009

(30) Foreign Application Priority Data
Nov. 29, 2005    (JP) ................. 2005-343360

(51) Int. Cl.
*H01J 40/14* (2006.01)
*G01C 21/02* (2006.01)

(52) U.S. Cl. ................. 250/214 R; 250/206.1
(58) Field of Classification Search ............ 250/214 R, 250/214.1, 208.2, 206.1, 221; 356/614, 213, 356/218, 222, 229, 230
See application file for complete search history.

(56) References Cited

U.S. PATENT DOCUMENTS

| | | | | |
|---|---|---|---|---|
| 3,649,122 | A * | 3/1972 | Holtz | 356/4.08 |
| 5,969,338 | A * | 10/1999 | Yoshitomi et al. | 250/221 |
| 6,707,497 | B1 * | 3/2004 | Pantigny et al. | 348/310 |
| 7,119,316 | B2 * | 10/2006 | Green et al. | 250/206.1 |
| 2003/0202172 | A1 * | 10/2003 | Douglas | 356/121 |

FOREIGN PATENT DOCUMENTS

| | | |
|---|---|---|
| JP | 1-100415 | 4/1989 |
| JP | 5-52560 | 3/1993 |
| JP | 6-112523 | 4/1994 |
| JP | 8-338706 | 12/1996 |
| JP | 9-210673 | 8/1997 |
| JP | 2004-309440 | 11/2004 |

* cited by examiner

*Primary Examiner* — Que T Le
*Assistant Examiner* — Pascal M Bui Pho
(74) *Attorney, Agent, or Firm* — Dickstein Shapiro LLP (57) ABSTRACT

A level sensor, i.e., a light receiving section (11X) having multiple light receiving elements (PDX1 to PDXn) arranged in parallel. In the level sensor, each two adjacent output terminals of the light receiving elements (PDX1 to PDXn) are connected by one of resistors (RX1 to RXn).

9 Claims, 9 Drawing Sheets

FIG.10

LEVEL SENSOR IMPLEMENTED WITH A PLURALITY OF LIGHT RECEIVING ELEMENTS

TECHNICAL FIELD

The present invention relates to a level sensor that detects the center of a light receiving position of a laser beam.

PRIORITY CLAIM

The present application claims priority from Japanese Patent Application No. 2005-343360 applied to the Japanese Patent Office on Nov. 29, 2005, the content of which is hereby incorporated by reference into this application.

BACKGROUND ART

Heretofore, a level sensor having a plurality of light receiving elements arranged up and down in parallel has been known. For example, see Japanese Patent Application Publication No. 2004-309440.

Such a level sensor amplifies received light signals outputted from the light receiving elements with respective multiple amplifiers, compares signals outputted from the amplifiers with a threshold using respective multiple comparators, and obtains a level, i.e., the center position of a laser beam, based on a comparison signal outputted from each comparator.

In such level sensor, an amplifier and a comparator should be arranged for each light receiving element, thus increasing the circuit complexity and cost.

Accordingly, there is a need for a level sensor with which a light receiving position of a laser beam can be obtained by just providing a simple circuit.

DISCLOSURE OF THE INVENTION

In order to achieve the above-described need, a first aspect of the present invention is a level sensor including a plurality of light receiving elements arranged in parallel, wherein each two adjacent output terminals of the plurality of light receiving elements is connected by a resistor, and based on signals outputted from both ends of the connected light receiving element, a light receiving position is analyzed by comparing the output signals using an operation control device connected to the level sensor.

A second aspect of the present invention is that a plurality of level sensors is arranged in an arrangement direction of the light receiving elements.

A third aspect of the present invention is that a light receiving position that equalizes signal ratios of output terminals is changed by changing a magnitude of the resistor connected to the light receiving elements, thereby analyzing the light receiving position with the operation device using any position as a reference for detecting the light receiving position.

A fourth aspect of the present invention is that ratios between output signals of the plurality of arranged level sensors are weighted-averaged so as to analyze a light receiving position with the operation device.

A fifth aspect of the present invention is that a plurality of level sensors is arranged in series, and that a light receiving position between adjacent level sensors is analyzed by comparing the outputs of these adjacent level sensors.

A sixth aspect of the present invention is that the level sensors arranged in series are provided so that light receiving positions of the adjacent level sensors overlap with each other.

A seventh aspect of the present invention is a level sensor which detects a center of a light receiving position of a laser beam, the level sensor including: a plurality of arranged light receiving elements which receives a laser beam, the light receiving elements having electrodes of one pole mutually connected; a first electric signal conversion element which converts a received laser beam into an electric signal proportional to a light quantity of the received laser beam, the first electric signal conversion element being connected between an electrode of the other pole of the light receiving element and another electrode of the other pole of the light receiving element adjacent to the former light receiving element; a second electric signal conversion element which converts a received laser beam into an electric signal proportional to a light quantity of the received laser beam, the second electric signal conversion element being connected to an electrode of the other pole of a light receiving element, among the plurality of light receiving elements, arranged at the very end in one direction; a third electric signal conversion element which converts a received laser beam into an electric signal proportional to a light quantity of the received laser beam, the third electric signal conversion element being connected to an electrode of the other pole of a light receiving element arranged at the very end in a direction opposite to the one direction; and a computer which receives a first electric signal generated in the second electric signal conversion element and a second electric signal generated in the third electric signal conversion element, the computer including an operation analysis processing section that performs an operation of obtaining a ratio between the first electric signal and the second electric signal based on the first electric signal and the second electric signal, and a comparison analysis processing section that compares a result obtained by the operation with a signal ratio at an origin position in the arrangement of the plurality of light receiving elements.

An eighth aspect of the present invention is a level sensor which detects a center of a light receiving position of a laser beam, the level sensor including: a first light receiving section; a first electric signal conversion element which converts a received laser beam into an electric signal proportional to a light quantity of the received laser beam, the first electric signal conversion element being connected to one end of the first light receiving section; a second electric signal conversion element which converts a received laser beam into an electric signal proportional to a light quantity of the received laser beam, the second electric signal conversion element being connected to the other end of the first light receiving section; a second light receiving section having the same optical-electrical characteristics as those of the first light receiving section and being linked to the first light receiving section; a third electric signal conversion element which converts a received laser beam into an electric signal proportional to a light quantity of the received laser beam, the third electric signal conversion element being connected to one end of the second light receiving section; a fourth electric signal conversion element which converts a received laser beam into an electric signal proportional to a light quantity of the received laser beam, the fourth electric signal conversion element being connected to the other end of the second light receiving section; and a computer which receives a first electric signal generated in the first electric signal conversion element, a second electric signal generated in the second electric signal conversion element, a third electric signal generated in the third electric signal conversion element, and a fourth electric signal generated in the fourth electric signal conversion element, the computer including an operation analysis processing section that performs an operation of obtaining a ratio between the first electric signal and the second electric signal based on the first electric signal and the second electric signal, and a comparison analysis processing section that compares a result obtained by the operation with a signal ratio at an origin position in the arrangement of the plurality of light receiving elements.

A ninth aspect of the present invention is that in the invention having the eighth aspect of the present invention, the first light receiving section and the second light receiving section have a predetermined amount of overlapping part.

A tenth aspect of the present invention is that the invention having the ninth aspect of the present invention further includes: a third light receiving section linked to the second light receiving section with a predetermined amount of overlapping part; and a fourth light receiving section linked to the third light receiving section with a predetermined amount of overlapping part.

DESCRIPTION OF THE REFERENCE NUMERALS

10 LEVEL SENSOR
11X LIGHT RECEIVING SECTION
PDX1 to PDXn LIGHT RECEIVING ELEMENT
RX1 to RXn RESISTOR

Best Modes For Carrying Out The Invention

Hereinafter, embodiments, which are modes of a level sensor of the present invention, will be described with reference to the accompanying drawings.

Figure 1:
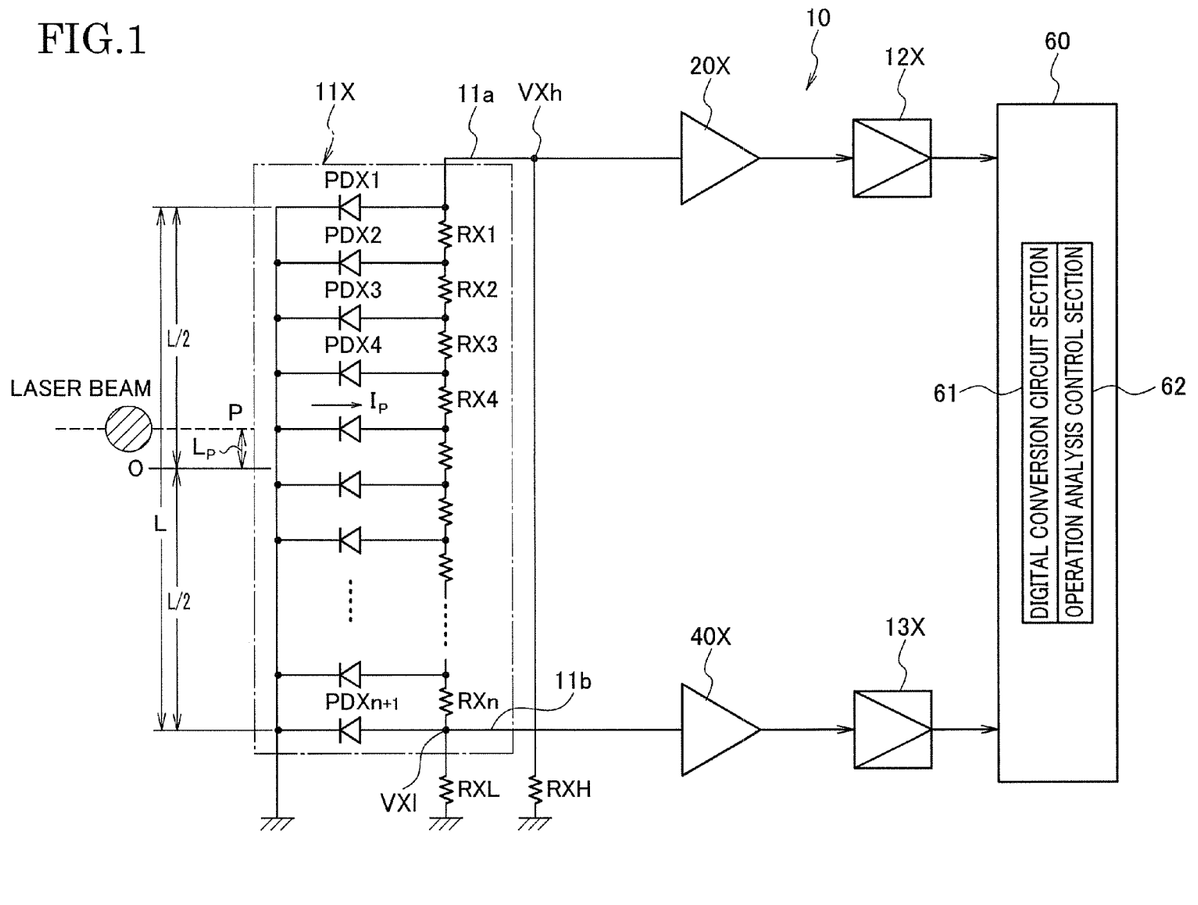
FIG. 1 is a block diagram illustrating a configuration of a level sensor according to a first embodiment of the present invention.

FIG. 1 is a block diagram illustrating a configuration of a level sensor 10 according to the present invention. This level sensor 10 includes: a light receiving section 11X; a first amplifier circuit 20X that amplifies a received light signal outputted from one terminal 11a of the light receiving section 11X; a first peak hold circuit 12X that holds a peak value of an amplified signal outputted from the first amplifier circuit 20X; a second amplifier circuit 40X that amplifies a received light signal outputted from other terminal 11b of the light receiving section 11X; a second peak hold circuit 13X that holds a peak value of an amplified signal outputted from the second amplifier circuit 40X; and an operation control device (operation control means) 60 that analyzes and obtains a light receiving position of a laser beam of the light receiving section 11X based on the peak values which the first and second peak hold circuits 12X, 13X hold.

The light receiving section 11X has a plurality of light receiving elements PDX1 to PDXn+1 including, for example, photodiodes, PIN photodiodes, or the like arranged up and down (in the vertical direction) in parallel. In the light receiving section 11X, anodes of each adjacent two of light receiving elements PDX1 to PDXn+1 are connected by one of resistors RX1 to RXn. In other words, output terminals of each adjacent two of the light receiving elements PDX1 to PDXn+1 are connected by one of the resistors RX1 to RXn.

Then, the anode of the light receiving element PDX1 is grounded through a resistor RXH while the anode of the light receiving element PDXn+1 is grounded through a resistor RXL.

While a photodiode is typically used for the light receiving element, it is preferable to use a PIN type photodiode if high speed is required.

The operation control device 60 includes a digital conversion circuit section 61 that converts peak values of the first and second peak hold circuits 12X, 13X to digital values, and an operation analysis control section 62 that analyzes and obtains a light receiving position of a laser beam of the light receiving section 11X based on the digital values converted in the digital conversion circuit section 61.

Next, operations of the level sensor 10 configured as described above will be described.

First, how to obtain a light receiving position P, which is a position in the light receiving section 11X irradiated with a laser beam, will be described briefly. FIG. 1 illustrates the laser beam and the light receiving position P.

When the light receiving elements PDX1 to PDXn+1 are irradiated with the laser beam, a current Ip is generated in a light receiving element that receives the laser beam. Since the current flows through the resistors RXH, RXL, a voltage is generated between both ends of the respective resistors.

Assume that the voltages of the resistors RXH, RXL are VXh, VXl, respectively, and that the resistor RXH=the resistor RXL. In order to efficiently detect the light receiving position P, RX1 to RXn, RXH and RXL may be set to satisfy ΣR(a sum of RX1 to RXn)>>RXH(RXL). The light receiving position P is represented by a distance Lp which is from a midpoint between the center of the first light receiving element PDX1 and the center of the (n+1)th light receiving element PDXn+1 to a position to be irradiated with the laser beam. In FIG. 1, the midpoint between the center of the first light receiving element PDX1 and the center of the (n+1)th light receiving element PDXn+1 is defined as the origin position, and the distance Lp to the light receiving position P can be obtained using the following formula (1):

$$Lp = L/2 \times ((VXh - VXl)/(VXh + VXl)) \quad (1)$$

where L represents a length of the light receiving section 11X. A length L represents the length between the center of the first light receiving element PDX1 and the center of the (n+1)th light receiving element PDXn+1.

Next, an output voltage VXp at the light receiving position P is obtained. Assuming that sums of resistance values from the light receiving position P to the RXH and to the RXL are $\Sigma$RXh, $\Sigma$RXl, respectively, an apparent resistance RXp at the light receiving position P can be obtained as a parallel connection of $\Sigma$RXh and $\Sigma$RXl, i.e., RXp=($\Sigma$RXh×$\Sigma$RXl)/($\Sigma$RXh+$\Sigma$RXl). Accordingly, the output voltage VXp at the light receiving position P is obtained by VXp=Ip×RXp.

Moreover, VXh and VXl can be obtained by VXh=VXp× RXH/$\Sigma$RXh, VXl=VXp×RXL/$\Sigma$RXl.

Hereinafter, an example of these values will be described.

As the laser beam, while the one having a wavelength in the range of approximately 500 nm to 1000 nm can be used, a laser beam having a wavelength of 870 nm is used in this embodiment. A conversion gain (radiation sensitivity) of the light receiving element is 0.47 A/W for a laser beam having a wavelength of 870 nm. When the emission output of the laser beam is 1 mW/mm$^2$, the current Ip generated in one light receiving element is obtained as Ip=1 mm$^2$×0.47 A/W×1 mW/mm$^2$=0.47 mA.

Actually, as the light receiving element, a PIN photodiode is used and a light receiving area (generally called an active area) thereof is 1 mm×1 mm. While a length of a pitch, i.e., a distance between a certain diode and a diode adjacent to this diode is necessary to be 5 mm or less, the length of the pitch implemented in this embodiment is set to 3.1 mm. The number of light receiving elements is 20 (PDX1 to PDX20). Since the length L can be obtained by the product of the length of the implemented pitch and the number of light receiving elements minus 1, L=3.1 mm×19=58.9 mm is obtained.

In the case of VXh=2.88V and VXl=2.72V, if the above-described values are assigned in order to obtain the Lp in the formula (1), Lp=0.84 mm is obtained. Moreover, RX1= . . . =RX19=7.5$\Omega$, $\Sigma$RXh=123.5$\Omega$, $\Sigma$RXl=131$\Omega$, RXp=63.6$\Omega$, Ip=0.1 mA, and VXp=6.36 mV are also obtained.

Meanwhile, the resistance between a certain light receiving element and an adjacent light receiving element includes the RX1 to RX19, where each of the resistance values thereof is equal, i.e., RX1= . . . =RX19=7.5$\Omega$. Moreover, the resistance RXH connected to the anode of the PDX1 and the resistance RXL connected to the anode of the PDX20 are set to RXH=RXL=56$\Omega$. Accordingly, $\Sigma$R=$\Sigma$R X1+ . . . +RX19=142.5$\Omega$, so $\Sigma$R>>RXH(RXL) is not satisfied in this case.

Actually, even when $\Sigma$R>>RXH(RXL) cannot be attained, what is needed is only to multiply by a light quantity ratio $\alpha$, which is a ratio for the case where the end position of the light receiving section 11X is irradiated with the laser beam. This value can be easily calculated from the resistors RX1 to RXn, and RXH, RXL.

While this light quantity ratio $\alpha$ can be obtained from an output ratio, i.e., a ratio between an output at the center of the sensor and an output of a light receiving element at the very end of the sensor, the light quantity ratio $\alpha$ can be obtained as $\alpha$=($\Sigma$RXn+RXLn+RXH)/$\Sigma$RXn since these outputs can be expressed by the resistance values. Where, RXH=RXL.

The distance Lp to the light receiving position P can be obtained from the following formula using the light quantity ratio $\alpha$.

$$Lp = \alpha \times L/2 \times ((VXh - VXl)/(VXh + VXl)) \quad (1')$$

Specifically, when $\Sigma$RXn=142.5$\Omega$ and RXL=RXH=56$\Omega$, $\alpha$ is obtained as $\alpha$=(142.5+56 +56)/142.5=1.786.

Moreover, although the equal intervals between light receiving elements are set in this embodiment, actually the intervals do not need to be equal. The light receiving elements can be arranged in the same state as is the case of the equal intervals, by adjustment of the values of resistors between the light receiving elements.

Figure 2:
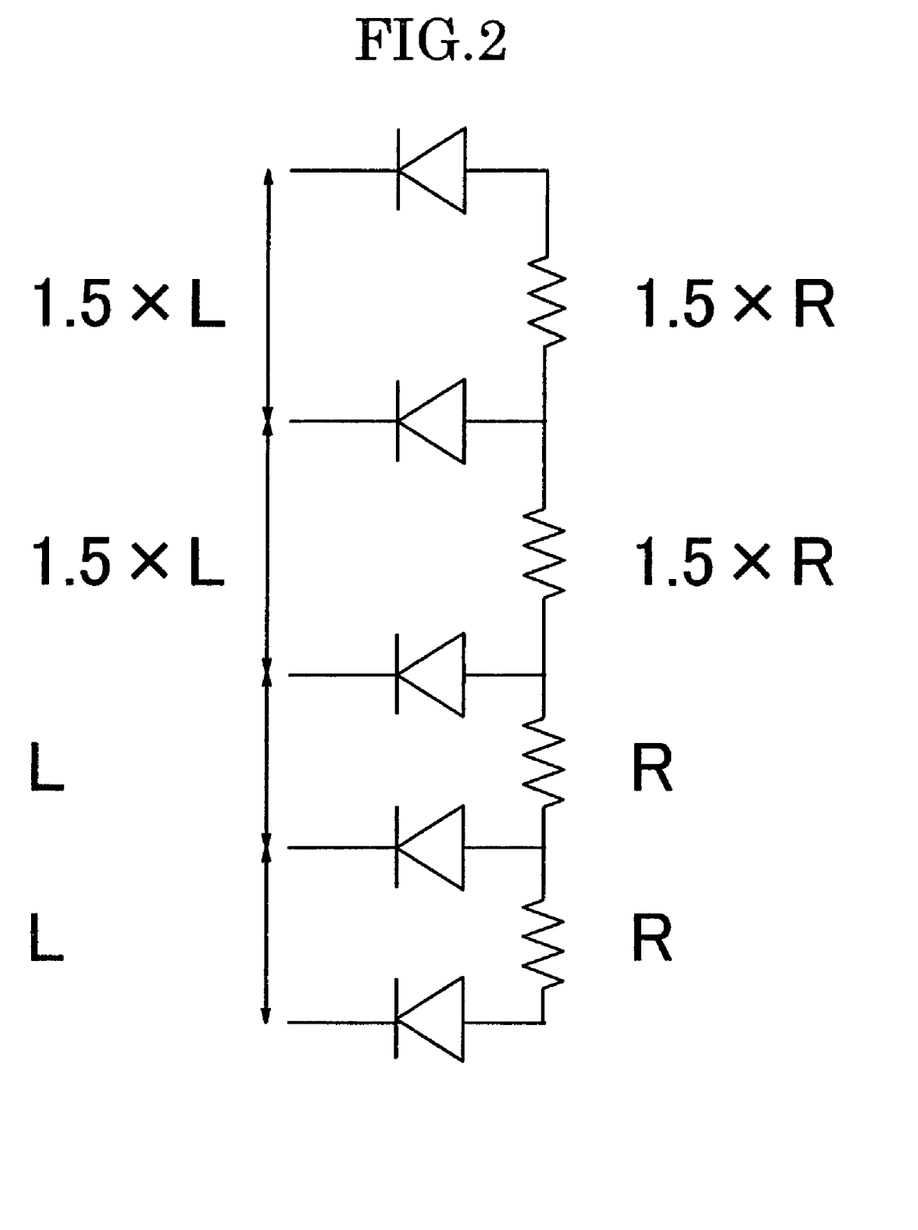
FIG. 2 is a diagram illustrating light receiving elements that are arranged so that pitch intervals between the light receiving elements may be different.

FIG. 2 is a diagram illustrating light receiving elements that are arranged so that the pitch intervals, i.e., the intervals between the light receiving elements, may be different. First, assume that five light receiving elements are each arranged with a pitch interval L for an adjacent light receiving element, and that a resistor with a resistance value R is connected between anodes of adjacent light receiving elements. Next, among three light receiving elements arranged on the upper side, if each pitch interval L therebetween is set to 1.5 times the pitch interval L, i.e., 1.5×L, as shown in FIG. 2, each resistance value R also needs to be set to 1.5 times the resistance value R, i.e., 1.5×R.

Specifically, in the case where the pitch interval L is 3.1 mm and the resistance value R is 7.5%, if the pitch interval becomes 1.5 times the pitch interval L, i.e., 4.65 mm, the resistance value R also needs to be set to 1.5 times the resistance value R, i.e., 11.25$\Omega$.

Moreover, the light receiving elements having the similar performances (area, photoelectric conversion amount) as those of the light receiving elements used in this embodiment do not need to be used. In either case, the height position Lp can be easily obtained using the ratio between the voltages VXh and VXl.

When the light receiving section 11X receives a laser beam emitted from a non-illustrated rotating laser device, a light receiving position of the light receiving section 11X, i.e., a light receiving element PDX that receives the laser beam, feeds a current corresponding to the amount of received light, and then the received light signals having voltages (VXh, VXl) corresponding to the current of this light receiving element PDX and the position of the light receiving element PDX are outputted from the terminals 11a and 11b, respectively.

These voltages VXh, VXl are amplified by the first and second amplifier circuits 20X and 40X. The peak values of the voltages of the received light signals amplified by these first and second amplifier circuits 20X and 40X are held by the first and second peak hold circuits 12X, 13X.

Figure 3:
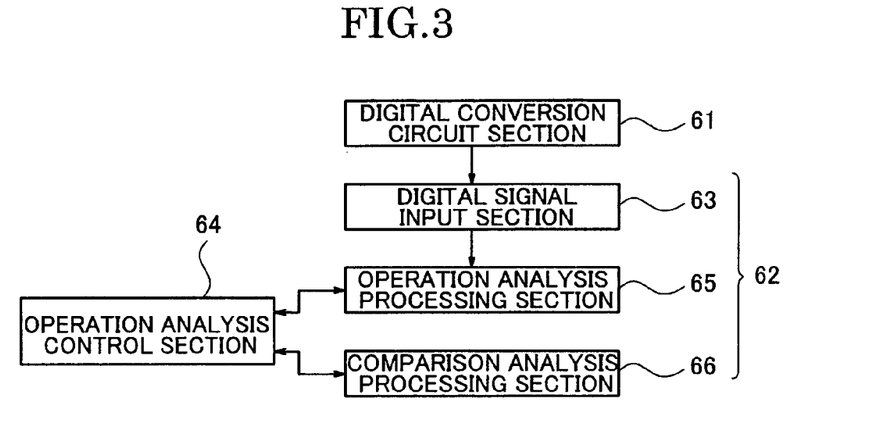
FIG. 3 is a block diagram illustrating a configuration of an operation control device according to the first embodiment of the present invention.

FIG. 3 is a block diagram showing a configuration of the operation control device 60 according to a first embodiment of the present invention. Block diagrams concerning the detection of a laser beam and the conversion into a voltage by the light receiving section 11X, the voltage amplification by the first amplifier circuit 20X and the second amplifier circuit 40X, and the holding of peak values of the voltages by the first peak hold circuit 12X and the second peak hold circuit 13X will be omitted.

The operation control device 60 includes the digital conversion circuit section 61 that converts an analog signal to a digital signal, and the operation analysis control section 62 connected to the digital conversion circuit section 61. The operation analysis control section 62 includes: a digital signal input section 63 that is an input part for receiving digitized signals; an operation analysis control section 64 that controls analysis on such as the calculation, comparison of the digital signals to be inputted; an operation analysis processing section 65 that calculates, analyzes, and processes the digital signals to be inputted; and a comparison analysis processing section 66 that compares, analyzes, and processes the digital signals to be inputted.

Figure 4:
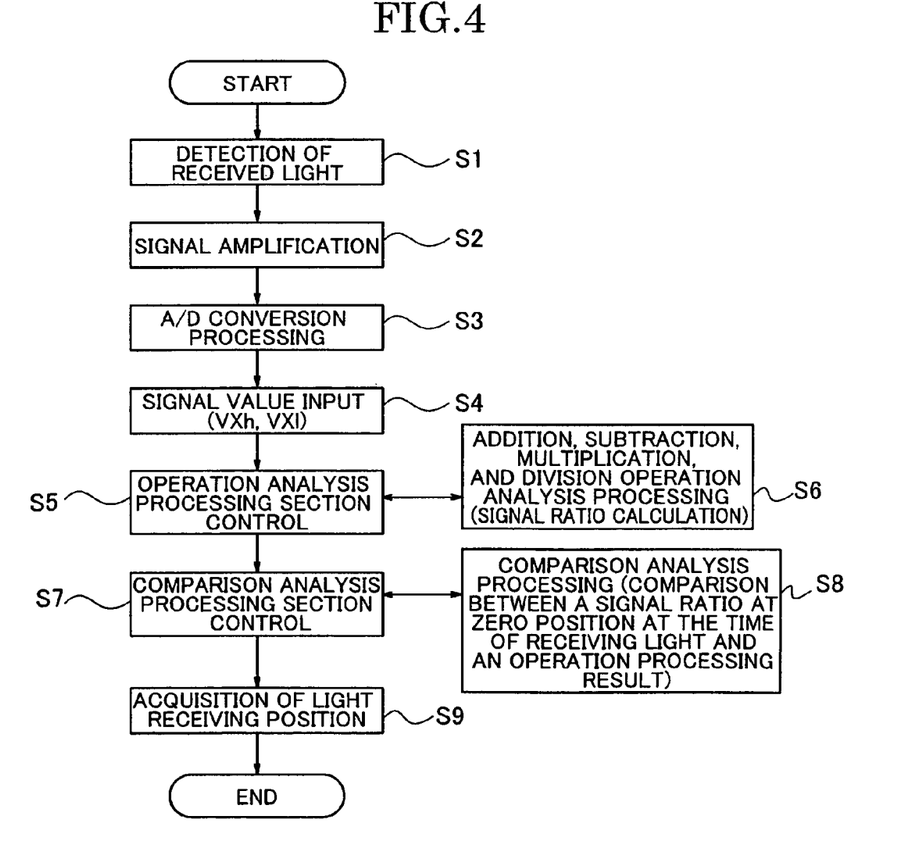
FIG. 4 is a flowchart showing functions of the level sensor according to the first embodiment of the present invention.

FIG. 4 is a flowchart showing functions of the level sensor 10 according to the first embodiment of the present invention. The flowchart of FIG. 4 will be described with reference to FIG. 1. In Step S1, the light receiving section 11X detects a laser beam. The voltage VXh is detected by the resistor RXH while the voltage VXl is detected by the resistor RXL. In Step S2, these voltages VXh, VXl are amplified by the first amplifier circuit 20X and the second amplifier circuit 40X, respectively. Then, as for the voltage-amplified signals, the peak values of the voltages are held by the first peak hold circuit 12X and the second peak hold circuit 13X, respectively.

In Step S3, these analog signals are inputted to the operation control device 60, and are converted to digital signals by the digital conversion circuit section 61. As shown in Step S4, these digital signals are based on the analog signal voltages VXh, VXl. In Step S5, these digital signals are inputted to the operation analysis processing section 65, whereby operation analysis on the addition, subtraction, multiplication, and division including calculation of a signal ratio are performed, as shown in Step S6. In Step S7, the comparison analysis processing section 66 performs comparison analysis processing in which a signal ratio at the zero position at the time of receiving light with the above-described operation processing result are compared.

As a result, in Step S9, the distance to the light receiving position P is obtained as shown in formula (1) or formula (1').

Note that, the operation analysis control section 64 is connected to the operation analysis processing section 65 and controls the operation analysis thereof, and the operation analysis control section 64 is also connected to the comparison analysis processing section 66 and controls the comparison analysis thereof.

As described above, just the first and second amplifier circuits 20X, 40X and the first and second peak hold circuits 12X, 13X need to be provided and it is not necessary to provide an amplifier or a comparator for each of the light receiving elements PDX1 to PDXn+1 in a conventional manner. Accordingly, the circuit configuration becomes simple.

Figure 5:
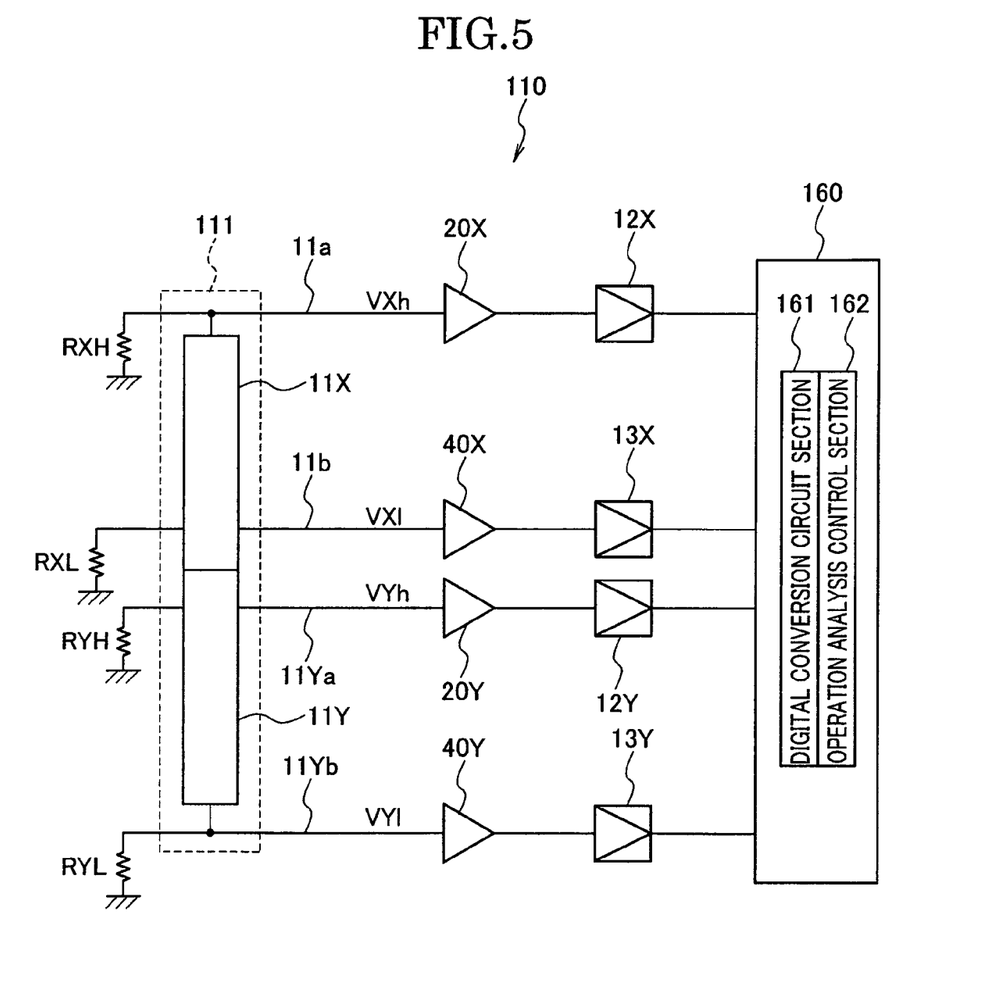
FIG. 5 is a block diagram illustrating a configuration of a level sensor of a second embodiment of the present invention.

FIG. 5 is a block diagram illustrating a configuration of a level sensor 110 that uses a light receiving section 111 of a second embodiment.

The light receiving section 111 is constituted by linking the light receiving section 11X to a light receiving section 11Y. The light receiving section 11Y is arranged along the direction in which the light receiving elements PDX1 to PDXn+1 of the light receiving section 11X are arranged in parallel.

Figure 6:
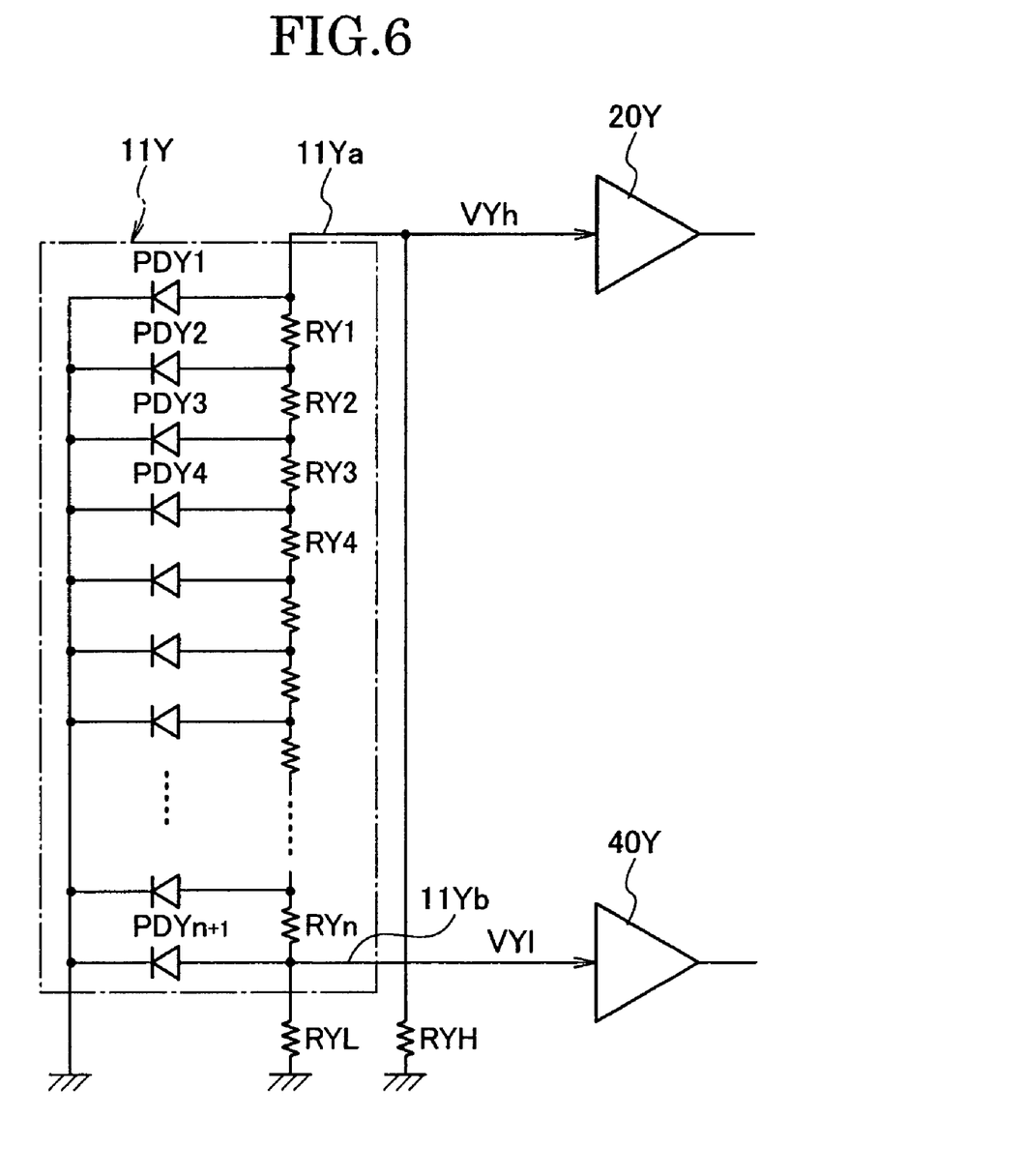
FIG. 6 is a circuit diagram illustrating a light receiving section of the second embodiment of the present invention.

FIG. 6 is a circuit diagram illustrating the light receiving section of the second embodiment of the present invention. Since the light receiving section 11X has already been described in the description of FIG. 1, the description thereof will be omitted here. As shown in FIG. 6, the light receiving section 11Y has multiple light receiving elements PDY1 to PDYn+1 consisting of photodiodes or the like arranged up and down in parallel. In the light receiving section 11Y, anodes of each adjacent two of light receiving elements PDY1 to PDYn+1 are connected by one of resistors RY1 to RYn. Then, the anode of the light receiving element PDY1 is grounded through a resistor RYH while the anode of the light receiving element PDYn+1 is grounded through a resistor RYL.

In FIG. 5, reference numeral 20Y represents a third amplifier circuit that amplifies a received light signal outputted from one terminal 11Ya of the light receiving section 11Y, reference numeral 12Y represents a third peak hold circuit that holds a peak value of an amplified signal outputted from the third amplifier circuit 20Y, reference numeral 40Y represents a fourth amplifier circuit that amplifies a received light signal outputted from other terminal 11Yb of the light receiving section 11Y, reference numeral 13Y represents a fourth peak hold circuit that holds a peak value of an amplified signal outputted from the fourth amplifier circuit 40Y, and reference numeral 160 represents an operation control device that analyzes and obtains light receiving positions of laser beams of the light receiving sections 11X, 11Y based on the peak values which the first to fourth peak hold circuits 12X, 13X, 12Y, 14Y hold. While this operation control device 160 includes a digital conversion circuit section 161 and an operation analysis control section 162, functions of this operation control device 160 are the same as those of the operation control device 60 described in FIG. 1. Accordingly, the description thereof will be omitted.

Next, operations of the light receiving section 111 and level sensor 110 configured as described above will be described.

Here, for convenience of description, assume that there is neither a gap nor an overlapping part between the light receiving section 11X and the light receiving section 11Y.

Since the light receiving sections 11X, 11Y are grounded through the resistors RXH and RXL, RYH and RYL, respectively, there will be differences between the voltages of signal outputs VXh and VXl, VYh and VYl outputted from the terminals 11a and 11b, 11Ya and 11Yb of the light receiving sections 11X, 11Y, respectively. These differences depend on the positions of a laser beam irradiated to the light receiving sections 11X, 11Y.

These signal outputs are related to the position irradiated with the laser beam and the values thereof vary corresponding to this position.

Figure 7:
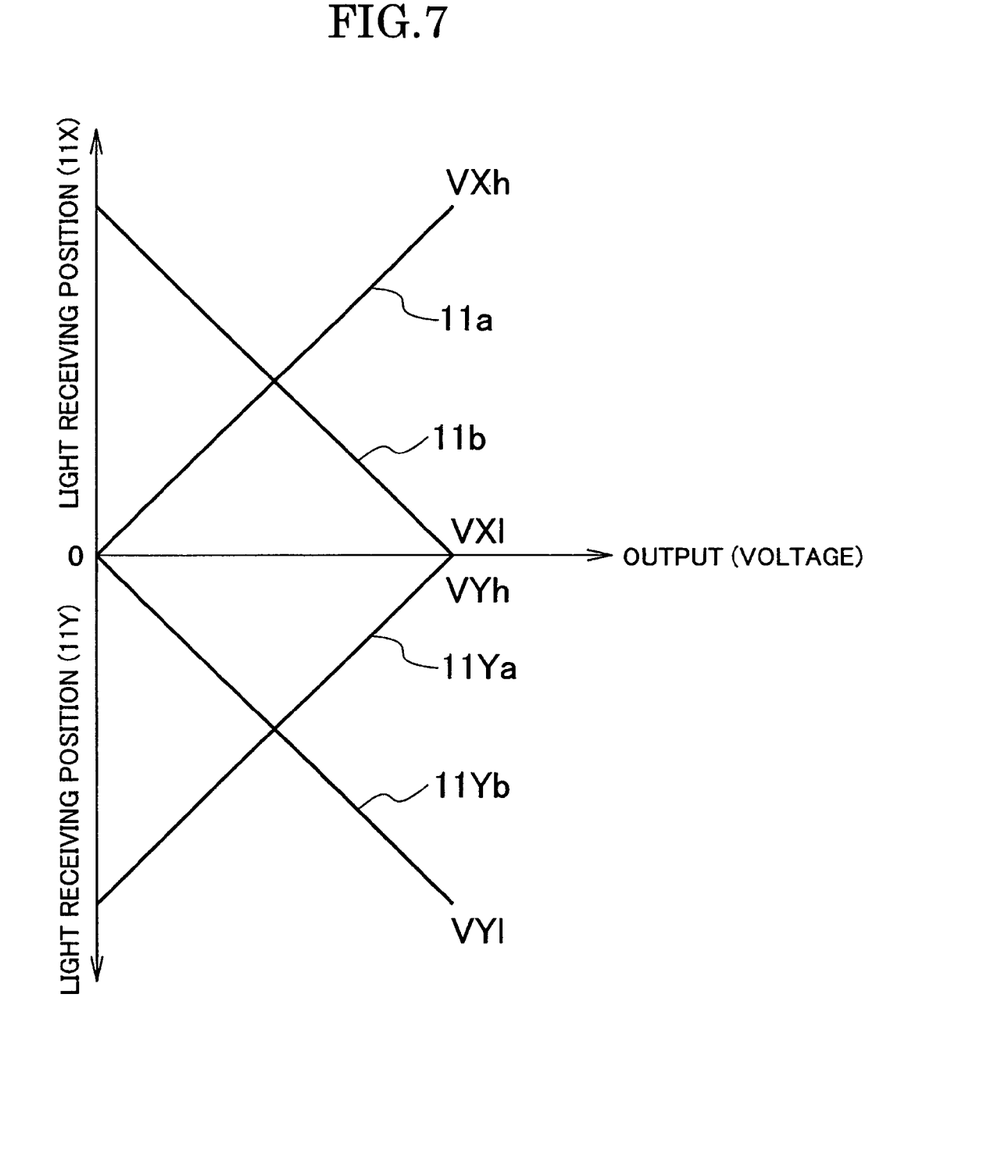
FIG. 7 is a graph with regard to a point light source, showing a relation between an output signal outputted from the light receiving section of the second embodiment of the present invention and a light receiving position.

If the laser beam is an ideal point light source, the voltages VXh and VXl, VYh and VYl outputted from the respective terminals 11a and 11b, 11Ya and 11Yb of the light receiving sections 11X, 11Y will be given as a graph shown in FIG. 7.

Focusing only on the light receiving section 11X, a distance Lx to the light receiving position P can be obtained from the output voltages VXh, VXl of the respective terminals 11a, 11b using the following formula (2).

$$Lx = \alpha \times L/2 \times (VXh - VXl)/(VXh + VXl) \quad (2)$$

When the values of L=58.9 mm and α=1.786, which have been used in Embodiment 1, are assigned to formula (2), it results in:

$$Lx = 52.5977 \times (VXh - VXl)/(VXh + VXl).$$

As for the output voltage VXp at the light receiving position P, the voltage is proportional to the resistance according to Ohm's Law. Specifically, even if the power of a laser beam varies and the current varies, the ratio between VXh and VXl will not vary and will depend only on the resistance values. Here, for better understanding, a case where only one of the light receiving elements is irradiated with a laser beam is described. However, the above relation can be kept even when the size of the laser beam increases and a plurality of light receiving elements are irradiated with the laser. In other words, the light receiving position P can be calculated depending on neither the beam brightness nor size of a laser beam.

Moreover, focusing only on the light receiving section 11Y, a distance Ly to the light receiving position P can be obtained from the output voltages VYh, VYl of the respective terminals 11Ya, 11Yb using the following formula (3):

$$Ly = \alpha \times L/2 \times (VYh - VYl)/(VYh + VYl) \quad (3)$$

provided that the lengths of the light receiving sections 11X, 11Y are each denoted by L, and a position where a laser beam passes through a position at 1/2L is defined as the zero position (origin position).

When the specific values are applied to Ly of formula (3), as in the case of Lx of formula (2), it results in:

$$Ly=52.5977\times(VYh-VYl)/(VYh+VYl).$$

From this result, it can be understood that the light receiving position P can be calculated depending on neither the beam brightness nor size of a laser beam.

For example, in the case where a position (which may not be the middle position) between the light receiving section 11X and the light receiving section 11Y is defined as the zero position (origin position), and where the light receiving section 11X is being irradiated with a laser beam, a distance Lpx to the light receiving position P of formula (1) is given by:

$$Lpx=(L/2)+Lx \qquad (4).$$

When the light receiving section 11Y is being irradiated with a laser beam, a distance Lpy to the light receiving position P is given by:

$$Lpy=-(L/2)-Ly \qquad (5).$$

In the second embodiment, since the entire length becomes long by linking the light receiving section 11X to the light receiving section 11Y, the light receiving position can be detected over a wide range. However, the accuracy is the same as that in Embodiment 1.

In the second embodiment, the gap between the light receiving sections 11X, 11Y is zero. However, if this gap is within the diameter of the laser beam, the light receiving position of the laser beam can be detected.

Figure 8:
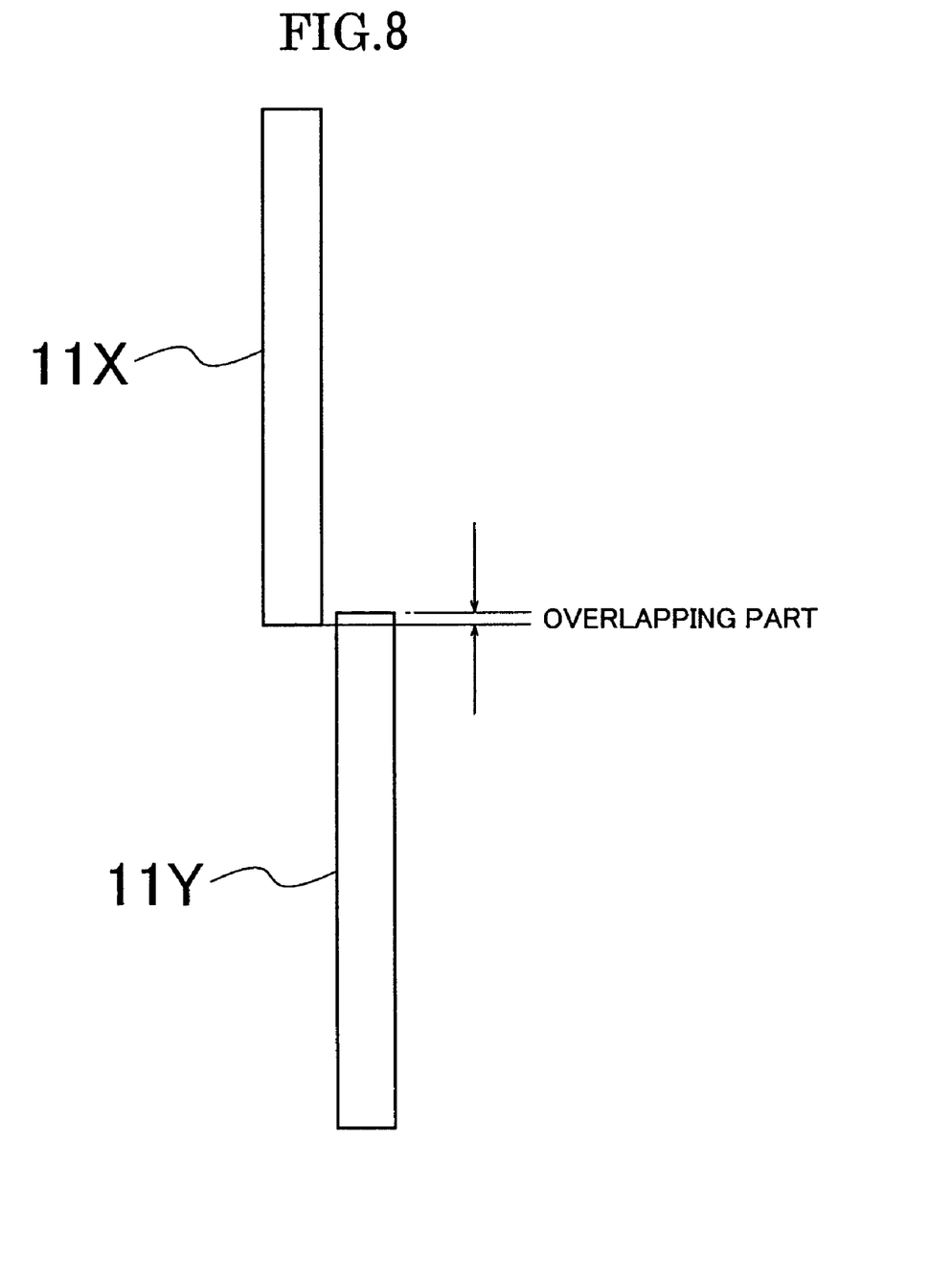
FIG. 8 is a modification of the second embodiment of the present invention, and is an explanatory view illustrating two light receiving sections with parts thereof overlap with each other.

FIG. 8 is a modification of the second embodiment of the present invention, and is an explanatory view illustrating two light receiving sections with parts thereof overlap with each other. As shown in FIG. 8, if the arrangement is made so that the light receiving sections 11X, 11Y may be shifted right and left to each other and the parts of the light receiving sections 11X, 11Y may overlap with each other in the up and down direction, the accuracy near the origin position between the light receiving sections 11X, 11Y can be improved.

For the amount (overlapping amount) of the part where the light receiving section 11X and the light receiving section 11Y overlap with each other, the overlapping amount is preferably about a half of the beam diameter while the beam diameter φ of the laser beam is around 5 mm to 20 mm. Moreover, there is no need to overlap by the amount of the beam diameter or more. Specifically, given the beam diameter of 5 mm as the minimum, the overlapping amount may also be set to 5 mm. However, even with the beam diameter of equal to or less than this amount, a sufficient effect can be obtained. In short, the overlapping amount may be suitably determined depending on the size of the beam diameter of a laser beam to be measured.

Figure 9:
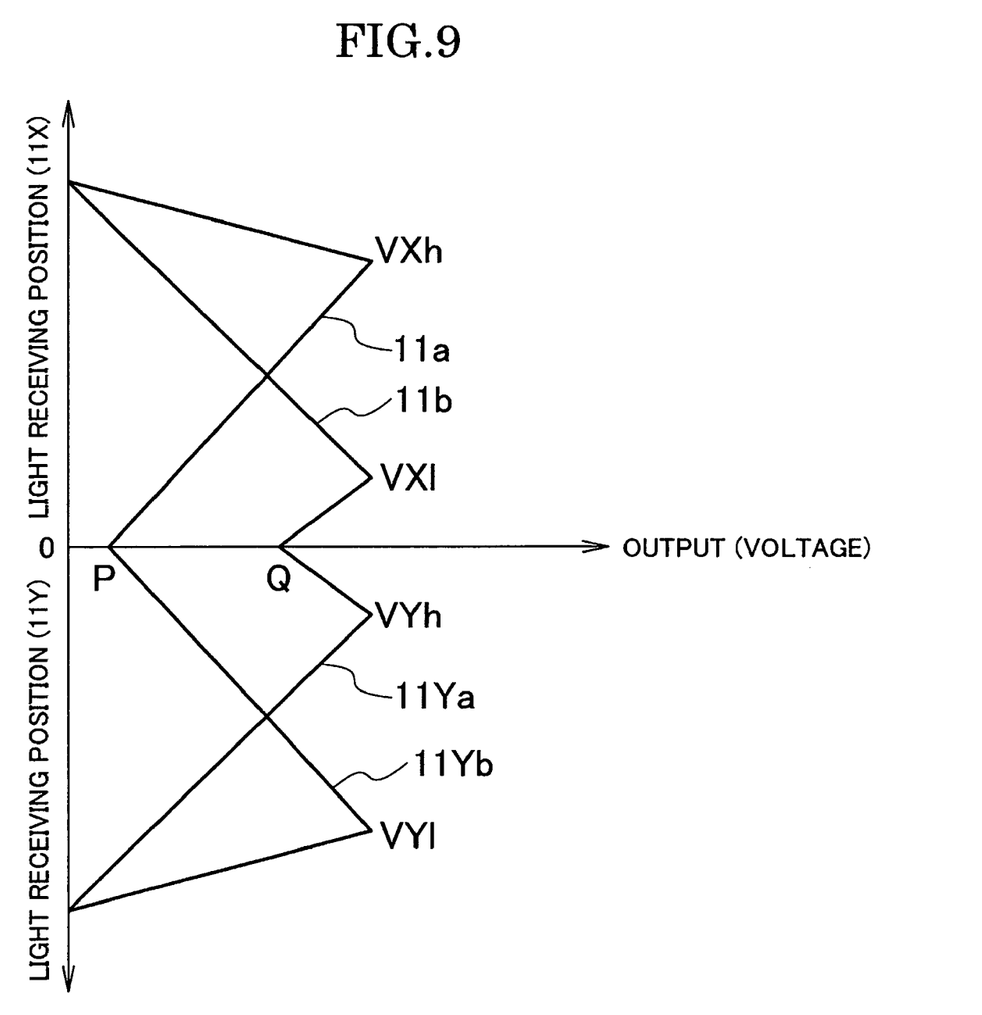
FIG. 9 is a graph showing a relation between an output signal outputted from the light receiving section of the second embodiment of the present invention and a light receiving position, showing a case where the beam diameter is large.

Meanwhile, a laser beam has a certain beam diameter, and for example, when the beam diameter is large and is 10 mm, the voltages VXh and VXl, VYh and VYl outputted from the respective terminals 11a and 11b, 11Ya and 11Yb of the light receiving sections 11X, 11Y in Embodiment 2 are given as the graph shown in FIG. 9 with respect to the light receiving position.

In FIG. 9, at the origin (indicated by 0) of the light receiving position, the values of the voltages VXh, VYl are indicated by P and the values of the voltages VXl, VYh are indicated by Q, respectively. Since these values P and Q are small as compared with the values of the graph shown in FIG. 7, an improvement is needed so as to obtain higher output voltages than the values P, Q. This can be achieved by overlapping a part of the light receiving section 11X with that of the light receiving section 11Y as shown in FIG. 8.

When the beam diameter is small, e.g., 5 mm or less, it is determined whether or not the sensor of either the light receiving section 11X or 11Y, which is currently receiving light, is currently receiving a laser beam, and then the light receiving position is obtained from the light receiving state of the level sensor which is currently receiving light.

When the beam diameter is large, e.g., 5 mm or more, the light receiving position is obtained from the light receiving states of both the light receiving sections 11X, 11Y. In this case, the light receiving position is obtained by weighted-averaging of the ratio of signals outputted from the light receiving sections 11X, 11Y. This calculation method will be described below.

When the light receiving sections 11X, 11Y are being irradiated with a laser beam, the light receiving position Lp is given by:

$$Lp=Lpx\times(Vx/Vxy)+Lpy\times(Vy/Vxy)=(Lpx\times Vx+Lpy\times Vy)/Vxy \qquad (6)$$

$$\text{where } Vx=Vxh+Vxl \qquad (7)$$

$$Vy=Vyh+Vyl \qquad (8)$$

$$Vxy=Vxh+Vxl+Vyh+Vyl \qquad (9).$$

Here, if just the light receiving section 11X is irradiated with a laser beam, Vy=0 and VX=VXy are satisfied. Accordingly, from formula (6), $$Lp=(Lpx\times Vx+Lpy\times 0)/Vx=Lpx \text{ is obtained.}$$

In the same way, if just the light receiving section 11Y is irradiated with the laser beam, Vx=0 and Vx=Vxy are satisfied. Accordingly, from formula (6), $$Lp=(Lpx\times 0+Lpy\times Vy)/Vy=Lpy \text{ is obtained.}$$

This indicates that the light receiving position can be obtained from formula (6) regardless of whether a laser beam at a light receiving position is a point light source or has a beam diameter.

In the meantime, the midpoint of the gap between the light receiving sections 11X, 11Y is the zero position (origin position) in terms of the position detection, and is the mechanical zero position as well as the electrical zero position (the voltage is zero). This means that the aforementioned position is fixed. For example, even if the beam of a laser beam has unevenness in brightness, the electrical zero position will not vary as long as this position is fixed. For this reason, a more reliable level sensor can be provided to users.

As described above, the voltages VXh and VXl, VYh and VYl outputted from the respective terminals 11a and 11b, 11Ya and 11Yb of the light receiving sections 11X, 11Y are amplified by the amplifiers 20X, 40X, 20Y, 40Y, respectively, and the peak values of the voltages amplified by the respective amplifiers 20X, 40X, 20Y, 40Y are held by the first to fourth peak hold circuits 12X, 13X, 12Y, 14Y, respectively. Then, the operation control device 160 obtains the light receiving position of a laser beam of the light receiving sections 11X, 11Y based on the peak values held by the first to fourth peak hold circuits 12X, 13X, 12Y, 14Y according to formula (6).

Figure 10:
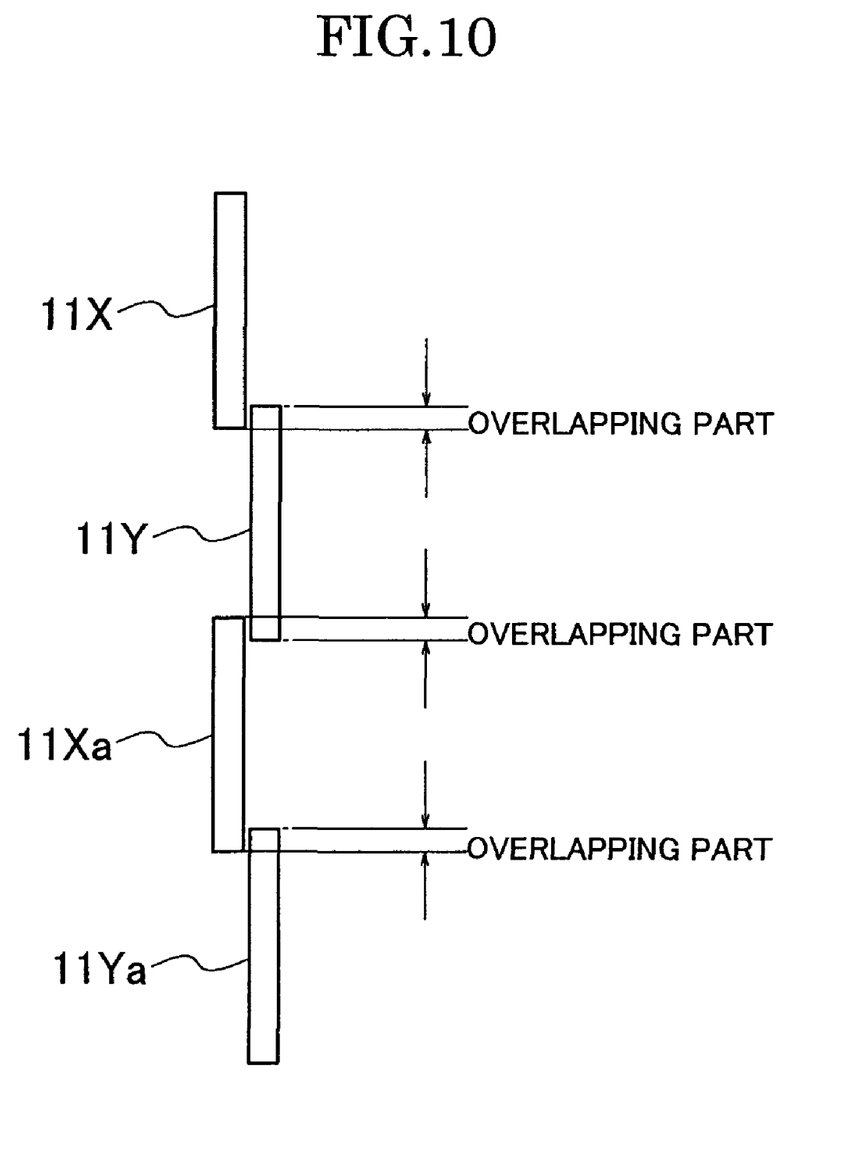
FIG. 10 is a third embodiment of the present invention, and is an explanatory view illustrating a level sensor having four light receiving sections with parts thereof overlap with one another.

FIG. 10 is a third embodiment of the present invention, and is an explanatory view of a level sensor having four light receiving sections with parts of these light receiving sections overlap with one another. Although in the above second embodiment the light receiving section 111 is constituted by the two light receiving sections 11X, 11Y, the light receiving section 111 may also be constituted by four light receiving sections 11X, 11Y, 11Xa, 11Ya as shown in FIG. 10. In this case, the lower end part of the light receiving section 11X and the upper end part of the light receiving section 11Y, the lower end part of the light receiving section 11Y and the upper end part of a light receiving section 11Xa, and the lower end of the light receiving section 11Xa and the upper end of a light receiving section 11Ya, overlap with each other, respectively.

While the overlapping amount between the light receiving section 11X and the light receiving section 11Y has been described earlier, this overlapping amount can also be applied to the third embodiment. In other words, the overlapping amount is preferably about a half of the beam diameter.

A level sensor constituted by a set of circuits has a limit in the expansion of the light receiving section in order to maintain accuracy. However, by arranging multiple light receiving sections in parallel, it is possible to expand the light receiving section extensively and inexpensively while maintaining the accuracy.

According to the present invention, the mutually adjacent output terminals of a plurality of light receiving elements are connected by resistors, respectively, so that just provision of a simple circuit allows for obtaining a level.

INDUSTRIAL APPLICABILITY

The present invention can be applied to level sensors that detect a light receiving position, i.e., the center position of a received laser beam, in the measurement field.

The invention claimed is:

1. A level sensor, comprising:
a plurality of light receiving elements arranged in parallel, wherein
each two adjacent output terminals of the plurality of light receiving elements is connected by a resistor,
a value of the resistor is defined in proportion to an interval between the light receiving elements adjacent to each other, and
based on signals outputted from both ends of the connected light receiving element, a light receiving position is analyzed by comparing the output signals using an operation control device connected to the level sensor wherein a magnitude of a value of the resistor which is connected to the light receiving element is set according to an interval of the light receiving elements such that signal ratios of the output signals of the light receiving elements become equal thereby the operation control device analyzes the light receiving position using any position along the plurality of light receiving elements as a reference for analyzing the light receiving position.

2. A level sensor comprising a plurality of level sensors according to claim 1 are arranged in an arrangement direction of the light receiving elements.

3. The level sensor according to claim 2, wherein
ratios between output signals of the plurality of arranged level sensors are weighted-averaged so as to analyze the light receiving position with the operation device.

4. A level sensor, comprising:
a plurality of level sensors according to claim 1 arranged in series, wherein
a light receiving position between adjacent level sensors is analyzed by comparing the outputs of these adjacent level sensors.

5. The level sensor according to claim 4, wherein the level sensors arranged in series are provided so that light receiving positions of the adjacent level sensors overlap with each other.

6. A level sensor which detects a center of a light receiving position of a laser beam, the level sensor, comprising:
a plurality of light receiving elements arranged in parallel which receive a laser beam, each light receiving element having first and second nodes, wherein the first nodes of the light receiving elements are mutually connected;
a first electric signal conversion element which converts a received laser beam into an electric signal proportional to a light quantity of the received laser beam, the first electric signal conversion element being connected between second nodes of adjacent light receiving elements wherein a value of the first electric signal conversion element is defined according to an interval between the light receiving elements adjacent to each other;
a second electric signal conversion element which converts a received laser beam into an electric signal proportional to a light quantity of the received laser beam, the second electric signal conversion element being connected to the second node of the light receiving element at a first end of the arrangement of light receiving elements;
a third electric signal conversion element which converts a received laser beam into an electric signal proportional to a light quantity of the received laser beam, the third electric signal conversion element being connected to the second node of the light receiving element at a second end of the arrangement of light receiving element; and
a computer which receives a first electric signal generated in the second electric signal conversion element and a second electric signal generated in the third electric signal conversion element, the computer, comprising:
an operation analysis processing section that performs an operation of obtaining a ratio between the first electric signal and the second electric signal based on the first electric signal and the second electric signal; and
a comparison analysis processing section that compares a result obtained by the operation with a signal ratio at an origin position in the arrangement of the plurality of light receiving elements.

7. A level sensor which detects a center of a light receiving position of a laser beam, comprising:
a first light receiving section comprising a plurality of first light receiving elements arranged in parallel;
a first electric signal conversion element which converts a received laser beam into an electric signal proportional to a light quantity of the received laser beam, the first electric signal conversion element being connected to one end of the first light receiving section;
a second electric signal conversion element which converts a received laser beam into an electric signal proportional to a light quantity of the received laser beam, the second electric signal conversion element being connected to the other end of the first light receiving section;
a middle section electric signal conversion element which converts a received laser beam into an electric signal proportional to a light quantity of the received laser beam, the middle section electric signal conversion element being connected to adjacent first light receiving elements, wherein a value of the middle section electric signal conversion element is defined according to an interval between its connected first light receiving elements;
a second light receiving section having the same optical-electrical characteristics as those of the first light receiving section and being linked to the first light receiving section;

a third electric signal conversion element which converts a received laser beam into an electric signal proportional to a light quantity of the received laser beam, the third electric signal conversion element being connected to one end of the second light receiving section;

a fourth electric signal conversion element which converts a received laser beam into an electric signal proportional to a light quantity of the received laser beam, the fourth electric signal conversion element being connected to the other end of the second light receiving section; and a computer which receives a first electric signal generated in the first electric signal conversion element, a second electric signal generated in the second electric signal conversion element, a third electric signal generated in the third electric signal conversion element, and a fourth electric signal generated in the fourth electric signal conversion element, the computer, comprising:

an operation analysis processing section that performs an operation of obtaining a ratio between the first electric signal and the second electric signal based on the first electric signal and the second electric signal, and a comparison analysis processing section that compares a result obtained by the operation with a signal ratio at an origin position in the arrangement of the plurality of light receiving elements.

8. The level sensor according to claim 7, wherein
the first light receiving section and the second light receiving section have a predetermined amount of overlapping part.

9. The level sensor according to claim 8, further comprising:

a third light receiving section linked to the second light receiving section with a predetermined amount of overlapping part; and a fourth light receiving section linked to the third light receiving section with a predetermined amount of overlapping part.

* * * * *